US009450780B2

(12) United States Patent
Wang et al.

(10) Patent No.: US 9,450,780 B2
(45) Date of Patent: Sep. 20, 2016

(54) PACKET PROCESSING APPROACH TO IMPROVE PERFORMANCE AND ENERGY EFFICIENCY FOR SOFTWARE ROUTERS

(75) Inventors: Ren Wang, Portland, OR (US); Jr-Shian Tsai, Portland, OR (US); Maziar H. Manesh, Kensington, CA (US); Tsung-Yuan C. Tai, Portland, OR (US); Ahmad Samih, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 550 days.

(21) Appl. No.: 13/559,992

(22) Filed: Jul. 27, 2012

(65) Prior Publication Data

US 2014/0029617 A1    Jan. 30, 2014

(51) Int. Cl.
| | |
|---|---|
| *H04L 12/26* | (2006.01) |
| *H04L 12/58* | (2006.01) |
| *H04L 12/54* | (2013.01) |
| *H04J 3/24* | (2006.01) |
| *G06F 13/28* | (2006.01) |
| *G06F 12/00* | (2006.01) |
| *H04L 12/801* | (2013.01) |
| *H04L 12/721* | (2013.01) |
| *H04L 12/741* | (2013.01) |
| *G06F 17/30* | (2006.01) |

(52) U.S. Cl.
CPC .............. *H04L 12/54* (2013.01); *H04L 45/38* (2013.01); *H04L 45/54* (2013.01); *H04L 47/10* (2013.01); *G06F 13/28* (2013.01); *G06F 17/30949* (2013.01)

(58) Field of Classification Search
CPC ....... H04L 45/54; H04L 45/38; H04L 47/10; H04L 47/245; H04L 49/9094; H04L 12/54; G06F 13/28; G06F 17/30949
USPC ........ 710/3, 33, 22; 370/392, 389, 235, 390, 370/395.7, 474, 394, 419, 428; 709/218, 709/250, 219, 227, 230, 239; 726/13, 2, 3, 726/4, 11, 12; 711/118, 122, 216
See application file for complete search history.

(56) References Cited

U.S. PATENT DOCUMENTS

| | | | |
|---|---|---|---|
| 6,363,384 B1 * | 3/2002 | Cookmeyer et al. | |
| 6,807,581 B1 * | 10/2004 | Starr et al. | 709/250 |
| 6,850,490 B1 * | 2/2005 | Woo et al. | 370/230 |
| 6,985,476 B1 * | 1/2006 | Elliott et al. | 370/349 |
| 7,769,905 B1 * | 8/2010 | Chu et al. | 709/250 |

(Continued)

*Primary Examiner* — Alpus H Hsu
*Assistant Examiner* — Camquyen Thai
(74) *Attorney, Agent, or Firm* — Law Office of R. Alan Burnett, P.S.

(57) ABSTRACT

Methods, apparatus and systems for improved performance and energy efficiency of software-based routers. A software router running on a host computer system employing multiple Network Interface Controllers (NICs) maintains a routing table wherein packet flows are classified as managed flows (MFs) under which packets are received at and forwarded from the same NIC and unmanaged flows UFs under which packets are received at and forwarded from different NICs. Forwarding table data is employed by a NIC to facilitate packet identification and flow classification operations under which the NIC determines whether a received packet is an MF, UF, or an unclassified flow. Under various schemes, packet forwarding for MFs is handled by the software router architecture such that either only the packet header is copied into memory in the host or the entire packet forwarding is handled by the NIC.

23 Claims, 8 Drawing Sheets

(56) References Cited

U.S. PATENT DOCUMENTS

| | | | |
|---|---|---|---|
| 8,640,220 B1* | 1/2014 | Vincent | G06F 9/5027 726/11 |
| 2002/0091636 A1* | 7/2002 | Carroll Bullard | 705/40 |
| 2004/0013117 A1* | 1/2004 | Hendel et al. | 370/394 |
| 2004/0024893 A1* | 2/2004 | Rajamony et al. | 709/230 |
| 2005/0080923 A1* | 4/2005 | Elzur | 709/238 |
| 2005/0091358 A1* | 4/2005 | Mehra et al. | 709/223 |
| 2006/0165074 A1* | 7/2006 | Modi et al. | 370/389 |
| 2007/0006293 A1* | 1/2007 | Balakrishnan et al. | 726/13 |
| 2007/0011358 A1* | 1/2007 | Wiegert et al. | 709/250 |
| 2007/0061492 A1* | 3/2007 | van Riel | 710/3 |
| 2007/0223483 A1* | 9/2007 | Huang | H04L 47/10 370/394 |
| 2007/0297453 A1* | 12/2007 | Niinomi | 370/474 |
| 2008/0052463 A1* | 2/2008 | Chitlur et al. | 711/118 |
| 2008/0133709 A1* | 6/2008 | Aloni et al. | 709/218 |
| 2008/0240111 A1* | 10/2008 | Gadelrab | 370/395.7 |
| 2009/0161676 A1* | 6/2009 | Breau et al. | 370/392 |
| 2010/0118868 A1* | 5/2010 | Dabagh et al. | 370/389 |
| 2010/0333101 A1* | 12/2010 | Pope et al. | 718/103 |
| 2011/0044171 A1* | 2/2011 | Csaszar et al. | 370/235 |
| 2011/0149966 A1* | 6/2011 | Pope et al. | 370/392 |
| 2011/0202696 A1* | 8/2011 | Kitahara | G06F 15/17337 710/33 |
| 2012/0198030 A1* | 8/2012 | Wang et al. | 709/219 |
| 2012/0203825 A1* | 8/2012 | Choudhary et al. | 709/203 |
| 2012/0317360 A1* | 12/2012 | Zettler | G06F 12/0888 711/122 |

* cited by examiner

PACKET PROCESSING APPROACH TO IMPROVE PERFORMANCE AND ENERGY EFFICIENCY FOR SOFTWARE ROUTERS

FIELD OF THE INVENTION

The field of invention relates generally to computer networks and, more specifically but not exclusively relates to technique for improving performance and energy efficiency of software routers.

BACKGROUND INFORMATION

Use of computer networks is ubiquitous in today's computing environments. Networks are employed for a wide range of computer uses, such as receiving and responding to e-mail, browsing the Web, updating a Facebook status, viewing an on-line video, making an on-line purchase and placing a VoIP call. With the rapid growth of so called "cloud-based" services, network utilization is forecast to continue being ever more important.

Networking is facilitated by various types of equipment including routers, switches, bridges, gateways, and access points. Large network infrastructure typically includes use of telecommunication-class network elements, including switches and routers made by companies such as Cisco Systems, Juniper Networks, Alcatel Lucent, IBM, and Hewlett-Packard. Such telecom switches are very sophisticated, operating at very-high bandwidths and providing advanced routing functionality as well as supporting different Quality of Service (QoS) levels. Private networks, such as Local area networks (LANs), are most commonly used by businesses and home users. While LANs may employ equipment with some advanced functionality, such as managed switches, such equipment is usually fairly simplistic in functionality.

Routing in small business and home networks is usually facilitated by one or two schemes. One of these schemes, common to most home networks, is to use hardware-based plug-and-play routers such as made by Linksys, D-Link, Netgear, Apple, etc. These routers may also provide dual functionality, such as serving as a wireless access point and/or switch. While there is some software functionality provided by today's home network routers, it is usually very limited. The other approach employs software-based routing that is implemented by a computer server with a corresponding server or network operating system. For example, Microsoft Windows Server products and Linux servers may be configured to support software-based routing. Compared to hardware routers, software routers usually do not provide the same level of latency and throughput performance for high demand traffic. However, a software router has certain advantages that makes it a desirable choice for small networks, e.g., low cost, flexibility to configure and re-configure, capability of multi-tasking, and optional support for more sophisticated functionality not available with small network hardware routers, such as security measures, firewalling, QoS, etc.

In recent years, technologies have been proposed to improve the performance of software routers, for example, Click and PacketShader. Click is a modular software architecture for building routers in a flexible way. Using Click architecture, a user can connect packet processing building blocks to build an efficient pipeline for packet routing. PacketShader is a new software router framework that utilizing the massively-parallel processing power of a Graphics Processing Unit (GPU) to address the central processing unit (CPU) bottleneck in the current software routers. However, even with these technologies, the payload memory copies, e.g., from the Network Interface Controller (NIC) input port to system memory, and from system memory to output port, are still a big portion of the total packet processing overhead. The overhead limits the performance and also increases energy consumption.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods, apparatus and systems for improved performance and energy efficiency of software-based routers are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
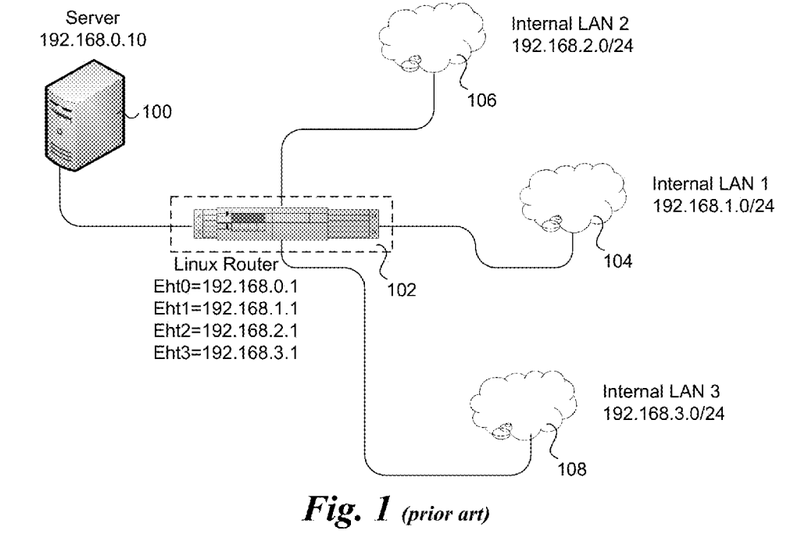
FIG. 1 is a schematic diagram illustrating an exemplary network employing a software-based router in a Linux server.

As an exemplary use of software-based routing, today's Linux distribution comes with built-in routing functionality, enabling Linux boxes (i.e., computers or servers implementing a Linux distribution) to operate as a software-based router. FIG. 1 shows an example of a network configuration that employs a Linux server 100 as a software router 102 that supports routing of packets between three subnets 104, 106, and 108. Although shown as a separate component for illustrative purposes, software router 102 is physically implemented within Linux server 100, as described in further detail below. As with conventional hardware-based routers, Linux router 102 employs a routing table that is used for determining which output port a received packet it to be routed through using well-known protocols and routing techniques. Packets from subnets 104, 106, and 108 are received at input ports of one or more NICs installed in Linux server 100, and are buffered up to the operating system (OS) where the routing table resides. After being processed, each packet is sent out to an appropriate NIC output port to route the packet to the correct destination subnet determined via the software-based packet routing scheme implemented by software router 102.

In general, the input and output ports employed for routing/forwarding a given packet may be on the same NIC or different NIC (if multiple NICs are employed). For example, newer Ethernet NICs support up to 8 ports, while a server such as Linux server 100 may be configured with one or more NICs, depending on the network complexity and the number of ports required to facilitate the desired routing paths through software router 102. For instance, a software router may be configured as a router for a given subnet by routing traffic along a single link between the router and an edge node in the subnet, as depicted in FIG. 1, or the router may be connected to the subnet via multiple links to a single edge node or multiple edge nodes.

Figure 2:
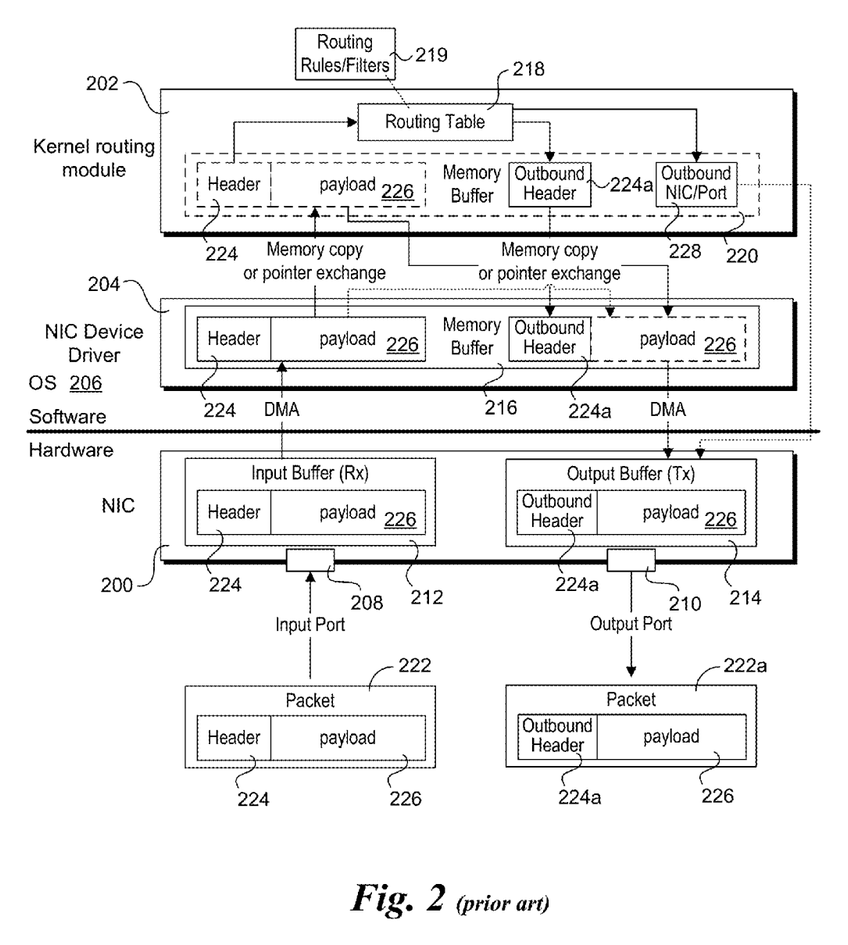
FIG. 2 is a combined architecture and flow diagram illustrating processing of packets using a conventional software-based router.

FIG. 2 depicts how packet processing is handled by a conventional software router under situations where the input and output ports are on the same NIC. The software router architecture includes a NIC 200 located in a hardware layer and a kernel routing module 202 and a NIC device driver 204 in a software layer comprising an operating system 206. NIC 200 provides a plurality of input and output ports, including an input port 208 and an output port 210. Input port 208 is operatively coupled to an input buffer 212, while output port 210 is operatively coupled to an output buffer 214.

NIC device driver 204 is used for providing an abstracted interface between operating system 206 and NIC 200. Device drivers are typically implemented as one or more software components in system memory managed by operating system 206. Conventional NIC device drivers provide or are otherwise associated with one or more memory buffers, such as depicted by a memory buffer 216. Although memory buffer 216 is depicted with the block in FIG. 2 designated NIC device driver 204, it will be recognized by those skilled in the art that FIG. 2 merely depicts a logical representation of selected device driver components, and that the memory buffer may be located apart from the code used for implementing NIC device driver 204.

Kernel routing module 202 comprises an operating system software component that is configured to perform software routing functionality. This is implemented, in part, via use of a routing table 218 including a set of forwarding rules and filters 219. The set of forwarding rules and filters is sometimes referred to as a forwarding table, as these rules and filters are configured to identify packets to be forwarded and the NIC output ports used for forwarding such packets. According, references to forwarding rules and filters herein may also be references to a corresponding forwarding table. Kernel routing module 202 also is depicted as including a memory buffer 220, which is shown in dashed outline to indicate this may represent a virtual or physical memory resource, as described below.

Under the conventional software router architecture of FIG. 2, routing packets proceeds as follows. During operation, multiple packets are received at the various input ports of NIC 200, as depicted by a packet 222 being received at input port 208. Each packet will include packet data comprising a packet header and a payload, as depicted by a packet header 224 and payload 226 for packet 222. Upon being received at an input port 208, the packet data is buffered in input buffer 212, which may be configured as a First-in, First-out (FIFO buffer). At this stage the packet data for packet 222 is stored either physically or logically, as depicted by packet header 224 and payload 226 in input buffer 212.

Under a FIFO buffer, received packets are processed (substantially) in the order they are received, with the packet data for each packet beginning at the end of the FIFO buffer and eventually advancing to the front or top of the buffer. Upon reaching this stage, packet header 224 and payload 226 are copied from input buffer 212 to memory buffer 216 using a direct memory access (DMA) operation. In brief, under a DMA operation memory accesses such as memory reads and writes are performed by hardware subsystems that operate independent of the system's CPU and operating system.

Once the packet header and payload is copied into memory buffer 216, routing for the packet may be implemented by kernel routing module 202. Depending on the particular implementation, kernel routing module 202 may either make another copy of packet header 224 and payload 226 and store corresponding data in memory buffer 220, or it may use pointers to manage access to the packet data stored in memory buffer 216. Routing is implemented by inspecting data in packet header 224, and performing a lookup of applicable forwarding rules and filters 219 in routing table 218 to determine which NIC and output port that packet is to be routed to, as depicted by outbound NIC/Port 228. For example, if the packet is a TCP/IP packet, an applicable rule of filter among a set of 5-tuple routing rules and filters may be employed that routes the packet based on its Source IP address, Destination IP address, Source Port, Destination Port, and Protocol, all of which are contained in the TCP/IP packet header. Of course, logic in kernel routing module 202 may be configured to support other protocols in addition to TCP/IP, such as UDP.

Under a common approach, data in the packet headers may be changed (i.e., updated) when processed by a router to generate outbound packet headers. For example, an IPv4 packet header contains a Time to Live (TTL) value that may be decremented by a router at each hop along its routing path. Other parameters may also be changed, including data in optional fields. Also, IPv6 packet headers include addition data or parameters that may changed. The result of changes to the packet header is depicted in FIG. 2 by an outbound packet header 230. In a manner similar to storage of data for packet header 224, data for outbound packet header 230 may be stored in memory buffer 220 and be copied to memory buffer 216, or it may be directly written to memory buffer 216 and managed by kernel routing module 202 using a pointing scheme. Optionally, data corresponding to packer header 224 may be modified in place (e.g., a stored in memory buffer 220 or memory buffer 216) to create outbound packet header 230.

Once the outbound packet header and outbound NIC/port data has been generated, device driver 204 and NIC 200 are employed in preparation for transmitting packet data comprising the outbound packet header 230 and original payload data 226 via the output port specified by outbound NIC/port 228. In this example, outbound NIC/port 228 indicates that the correct output port is output port 210, which is associated with output buffer 214. Thus, preparing the packet data for outbound transmission involves employing a second DMA operation to copy data from memory buffer 216 corresponding to outbound packet header 230 and payload 226 to outbound buffer 214. This may involve one or more DMA operations, depending on the size of the packet and whether data for payload 226 and outbound packet header 230 are stored together or separately. For example, in one embodiment, data for payload 226 is copied from the original storage location of payload 226 in memory buffer 216 to output buffer 214 using a pointer scheme, while in another embodiment a copy of payload 226 is written to memory buffer 216 such that the data for outbound packet header 230 and payload 226 are stored together. In the former case (separate storage), at least two DMA operations are performed, while a single DMA operation may be employed if the data are stored together (when considering the copying of multiple contiguous cache lines to constitute a single DMA transaction).

Output buffer 214 may be logically configured as a FIFO buffer, with outbound packet data comprising outbound packet header 230 and payload 226 being added to the end of the buffer and eventually reaching the front of the buffer, at which point it is sent outbound as a packet 232. In practice, the packet data may be written to a memory buffer, while pointers to the packet data are written to a data structure that is implemented as a FIFO, such as a circular buffer.

The foregoing conventional approach for forwarding packets that are received and transmitted out the same NIC may involve significant overhead. For example, performing operations on packet data may not only involve copying data to system main memory (e.g., DRAM employed by a server running the illustrated operating system, device driver, and kernel routing module), but copying the same data to one or more levels of cache such that the data can be accessed and operated on by a CPU or processor core. For example, modern processors may employ local L1 and L2 caches, along with a distributed L3 or Last Layer Cache (LLC), wherein the each successive cache level (LLC/L3, L2, L1) is typically smaller and faster than the previous level. In order to copy packet data (e.g., packet header and payload) into a cache level, some existing blocks of data have to be evicted to make space for the corresponding blocks of packet data. In some cases, the evicted blocks are needed later and have to be brought in again, which causes power and performance degradation.

Returning to FIG. 1, under some deployments a Linux server may be implemented primarily as a router and/or otherwise a substantial portion of traffic that is routed by software router 102 is destined for an endpoint other than Linux server 100. Accordingly, the packet routing operations for such traffic will merely involve forwarding the packets, with no operations being performed on the packet payload data.

In accordance with some embodiments, routing may be implemented using a software-based router in a manner that does not involve the copying of packet payload data into cache memory for packets that are to be forwarded. When the NIC performs a 5-tuple lookup (or other criteria employed for routing), it can identify if the packet is only for forwarding by inspecting the destination address. If the destination address is not itself (i.e., the IP address of the Linux software router host), then the packet is to be forwarded. In this case, if there is no other service that requires access to the packet payload, the payload will stay in the local NIC memory and not enter host cache memory. This reduces memory access power and potentially improves performance by keeping useful blocks in the cache memory without evicting them.

Figure 3:
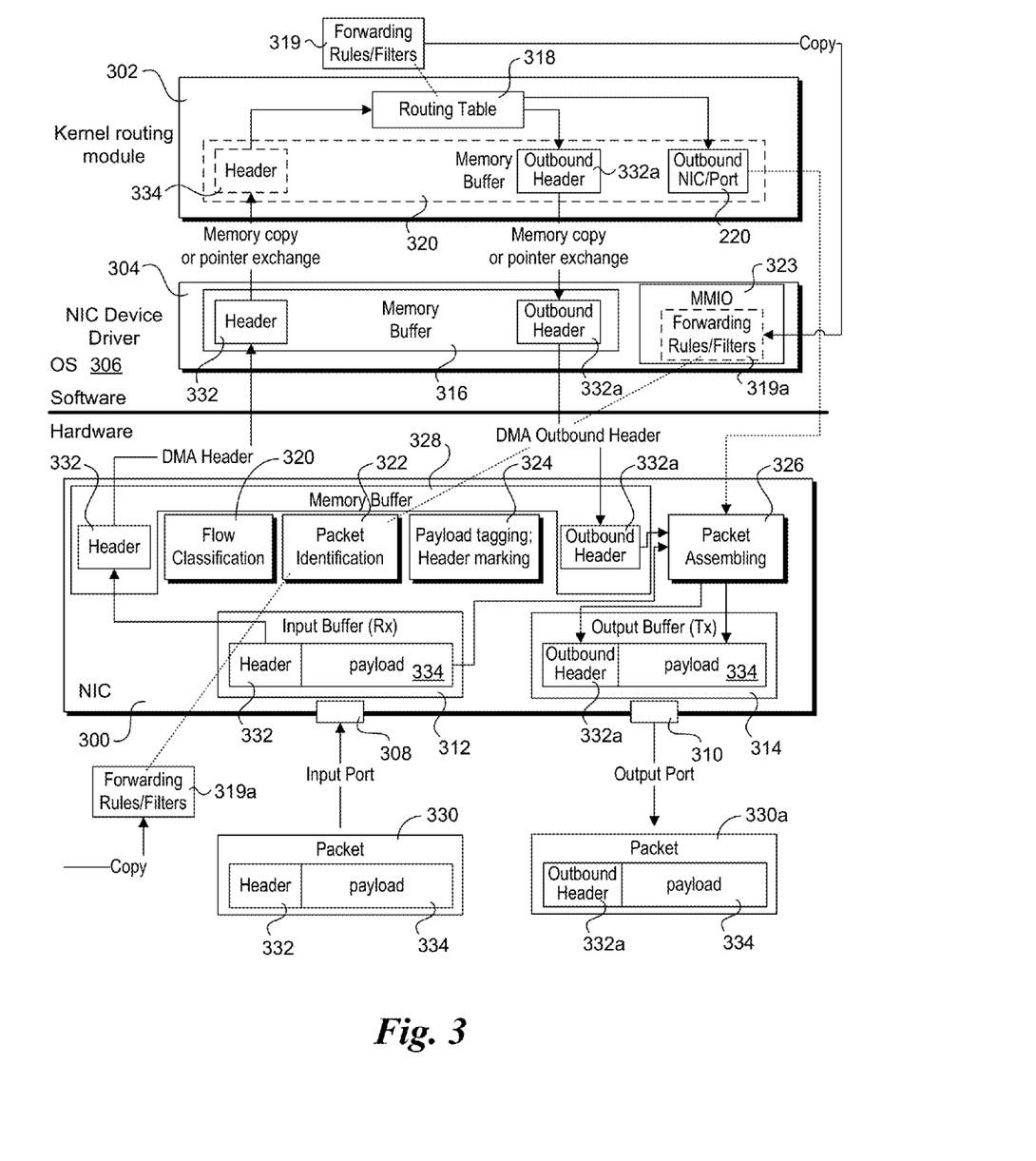
FIG. 3 is a combined architecture and flow diagram illustrating processing of packets under which the payload for packets received at and forwarded from the same NIC remain in the NIC and are not copied into host memory for a software-based router, according to one embodiment.

FIG. 3 shows a software router architecture for implementing a software-based router with reduced overhead and improved performance and efficiency, according to one embodiment. The architecture includes a NIC 300 located in a hardware layer and a kernel routing module 302 and a NIC device driver 304 in a software layer comprising an operating system 306. As before with NIC 200, NIC 300 provides a plurality of input and output ports, including an input port 308 and an output port 310. Input port 308 is operatively coupled to an input buffer 312, while output port 310 is operatively coupled to an output buffer 314. NIC device driver 304 provides an abstracted interface between software components operating in the software layer and NIC 300, and includes a memory buffer 316. Kernel routing module 302 employs some aspects that are similar to kernel routing module 202, and includes a memory buffer 317 and a routing table 318 including a forwarding table comprising forwarding rules and filters 319.

NIC 300 is further configured to perform packet processing operations that reduce the workload of and associated memory overhead operations that would be employed by software components under the conventional approach of FIG. 2. These operations are facilitated by various blocks including a flow classification block 320, a packet identification block 322, a payload tagging and header marking block 324, and a packet assembling block 324. NIC 300 also includes a memory buffer 328 which for simplicity is depicted as a single block but in practice may be implemented as one or more portions of memory allocated for storing data.

Flow classification block 320 is employed for classifying packets into packet flows comprising Managed Flows (MF) or Unmanaged Flows (UF). It receives packet header data extracted by Packet Identification block 322 and determines whether the packet corresponds to a new flow or an existing classified flow using forwarding table comprising a set of forwarding rules and filters 319a. Each packet for a new flow (i.e., a packet having a header fields that map to an unrecognized 5-tuple value or other filter/rule(s) used for classifying packet flows) is sent to the software layer for software router processing, which includes a lookup in routing table 318 to determine whether the input and output ports that are mapped to the source and destination IP addresses specified in the packet header belong to the same NIC. If so, the flow is classified as an MF. If the input and output ports are on different NICs, then the packet flow is classified as a UF. Each MF will be given a unique flow ID (e.g., an identifier that is derived from the packet's 5-tuple values), and a corresponding forwarding filter is added to forwarding rules/filters 319 and copied into forwarding rules/filters 319*a* along with the flow ID. UFs may also be assigned flow IDs under one embodiment and have corresponding flow IDs and filters added to forwarding rules/filters 319 and 319*a*.

Many modern NICs, including NICs manufactured by Intel® Corporation, support a feature under which packet headers may be extracted from received packets and separated from the packet payload data on the NIC itself For example, for a TCP/IP packet, the TCP and IP packet headers may be separated from the packet payload. Once the packet header data is separated, applicable fields in the header(s) are inspected and corresponding data is extracted to be used by Flow Classification block 320 for flow classification. For example, information in the packet header (e.g., source/destination address, port and socket) can be used to identify whether the packet belongs to a classified flow (MF or UF) or is the first packet of a new, unclassified, flow.

Packet Identification block 322 may be configured to determine flow ID's using filtering logic similar to that employed by large network routers and software routers, as will be recognized by those skilled in the art. Under a common approach, one or more filters comprising a set of rules is applied to applicable header field data, such as 5-tuple data. In one embodiment, a hash on a concatenation of the 5-tuple values is employed for MF and UF FlowID lookup: if a hash on the 5-tuple values of an incoming packet matches an existing FlowID hash, the packet belongs to a classified flow (MF or UF); if not, the packet belongs to a new flow that is unclassified. When the same filter rules employed by kernel routing module 302 are implemented in Flow Classification 320 and Packet Identification block 322, the flow IDs for packets received by NIC 300 can be determined by the NIC 300 itself For example, this situation is depicted by forwarding rules/filters 319 and 319*a* in FIG. 3.

In one embodiment, forwarding rules/filters 319*a* may comprise a portion of system memory mapped to a Memory Mapped I/O (MMIO) address space 323. MMIO enables hardware devices, such as NICs, to access a portion of a host's system memory address space as if the memory was on the hardware device itself (when not considering the aspect that the Read and Write transactions involve access to the system memory). In one embodiment, MMIO address space allocation and access is handled by NIC device driver 304. The MMIO address space may also be employed for forwarding rules/filters 319 and/or a copy scheme may be used that maintains a shadow copy of forwarding rules/filters 319 in the MMIO address space for forwarding rules/filters 319. Accordingly, when forwarding filters and/or rules are written for new classified flows by kernel routing module 302 into forwarding rules/filters 319, a copy of the filters and/or rules are written into forwarding rules/filters 319*a*.

In one embodiment, the following operations are performed after packet identification:
   a. If the packet belongs to an MF: payload will be tagged and left in a NIC buffer, while the packet header will be marked (as described below) and DMAed to the host (i.e., into system memory) to be processed by the kernel routing module.
   b. If the packet is the first packet of a new flow, the packet header and payload will be DMAed to the host and processed by the kernel routing module to create a new flow ID and filter rule(s).
   c. If the packet belongs to a UF: the packet header and payload will be DMAed to the host, and a packet including outbound header data will be routed by kernel routing module to an output port on another NIC.

Packets that are classified to managed flows are received by and output from the same NIC. Additionally, since these are forwarded packets, there are no operations that need to be employed by the kernel routing module to the packet payload data. Accordingly, the packet payload data is buffered in the NIC and not DMAed to the host, and remains in the NIC until later processing relating to outbound packet assembly and transmission. In order to properly identify which payload belongs to which header (for outbound packet assembly), the payload is tagged with a flow ID and sequence number. Thus when the outbound header comes back from the software routing module, the payload can be re-unioned with its proper header to be sent out to the output port.

In connection with processing packets for managed flows, the packet headers are processed by kernel routing module 302. Part of this process includes a header marking operation under which the packet header is marked in a manner that identifies it as belonging to a managed flow, and thus no payload processing is to be performed. For example, a bit or bits in a selected header field (e.g., one or both of the Type of Service bits) may be encoded to indicate whether or not the packet header corresponds to a managed flow. In instances in which TCP/IP checksums are performed by NIC 300 (a capability provided by many modern NICs), header marking may not be necessary.

Figure 4:
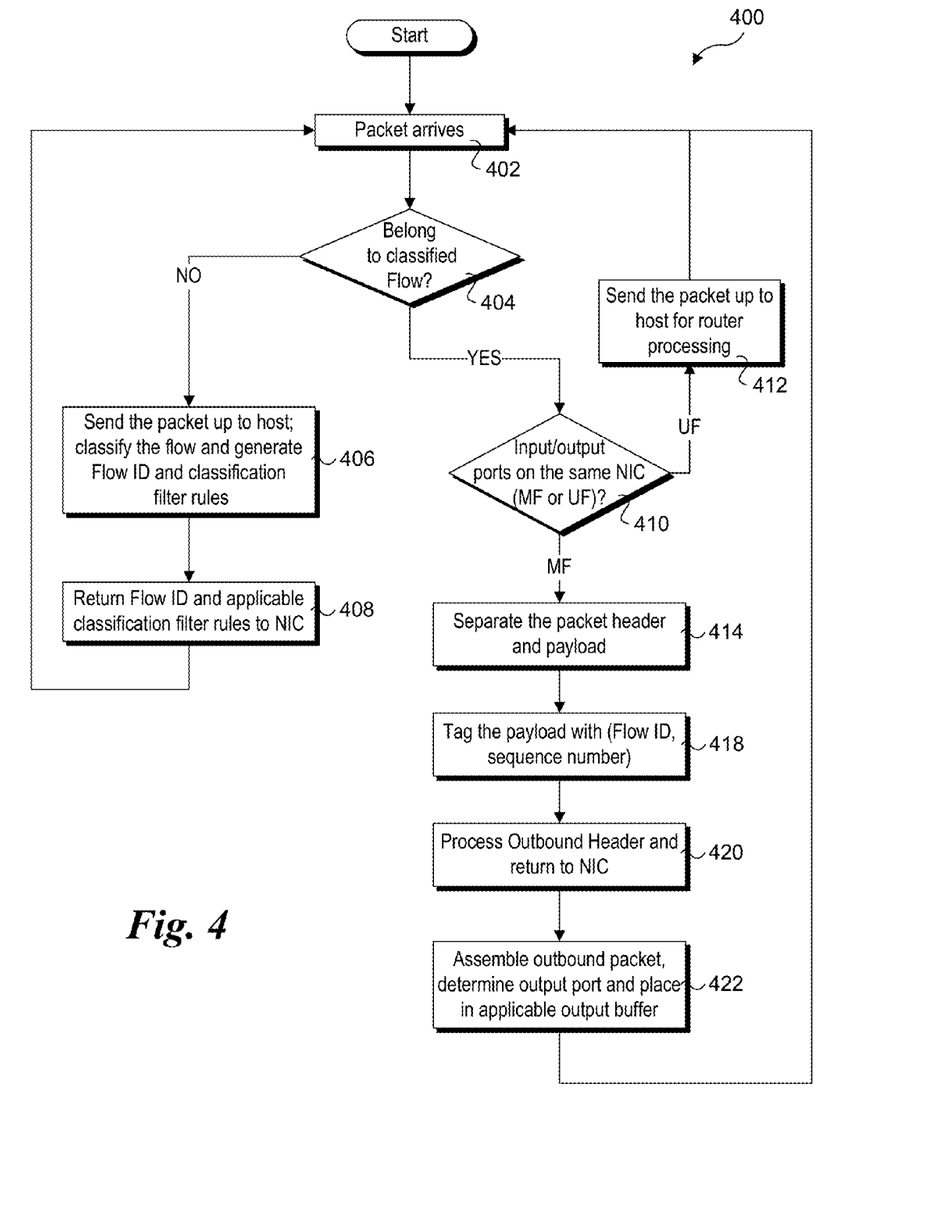
FIG. 4 is a flowchart illustrating operation performed during packet processing corresponding to the a software-based router architecture of FIG. 3.

With further reference to the flowchart 400 in FIG. 4, processing of packets by the software router architecture of FIG. 3 proceed as follows. In response to a packet arriving (block 402) at a NIC input port, a determination is made in a decision block 404 to whether the packet belongs to a classified flow. If not, the logic proceeds to a block 406 in which the packet is sent to the host via a DMA operation for processing by kernel routing module 302. The flow is classified, which generates a new Flow ID and classification filter rules. The Flow ID and applicable classification filter rules are then returned to NIC 300 in a block 408 (or written to MMIO), and the logic returns to block 402 to process the next packet.

Returning to decision block 404, if the packet belongs to a classified flow, the logic proceeds to a decision block 410, where a determination is made to whether the input and output ports associated with the flow ID are the same (or otherwise determining whether the flow is a managed flow or an unmanaged flow). If the flow is an unmanaged flow, the logic proceeds to a block 412 in which the packet is sent to the host for router processing via a DMA operation similar to that shown in FIG. 2 and discussed above. After router processing of the packet is completed, the logic returns to block 402 to process the next packet.

If the packet belongs to a managed flow, as determined by decision block 410, the logic proceeds to a block 414 in which the packet header and payload are separated by NIC 300. The payload is then tagged with a flow ID and sequence number in a block 416, and the header is sent to the host for router processing in a block 418, as explained in further detail below. Once processing of the header is completed by kernel routing module 302, the outbound header is returned to NIC 300 via a DMA operation in a block 420, and an outbound packet is assembled in a block 422 by combining the outbound packet header and the previously tagged payload and placed in the outbound buffer for the applicable output port, leading to the packet being transmitted out of the output port. The logic then returns to block 402 to process the next packet.

Returning to FIG. 3, processing a packet belonging to a managed flow proceeds as follows. An inbound packet 330 including a packet header 332 and payload 334 is received at input port 308 and buffered in input buffer 312. At this stage, the packet header can either be inspected in place (i.e., from input buffer 312) or copied to memory buffer 328, as depicted. For example, some input buffers may be implemented as a set of pointers in a circular buffer (which implement the FIFO function) that point to packet data stored in NIC memory, allowing inspection of that data in place. Operations are performed by Packet Identification block 322 and Flow Classification block 320 to determine whether the packet belongs to a MF, UF, or is unclassified, as described above. In this example, it is presumed the packet belongs to a managed flow.

For managed flows, the processing of the packet header and payload is separated. First, packet header 332 is marked as an MF header via Payload tagging and Header Marking block 324. Packet header 332 is then copied into the host system memory (e.g., into memory buffer 316 or another memory buffer not shown) using a DMA operation. Depending on whether packet header 332 was inspected in place or not, it could be DMAed from either input buffer 312 or memory buffer 328.

Next, header 332 is processed by kernel routing module 302. This processing is similar to the conventional processing performed by kernel routing module 202 discussed above, including a lookup of routing table 318 to identify the application output port and generating an outbound header 332*a*. During processing of header 332, kernel routing module 302 identifies packet header 332 as belonging to a managed flow and recognized it only is handling the packet header and not the packet payload. In one embodiment, rather than DMAing outbound header 332*a* to an output buffer associated with the applicable output port, outbound header 332*a* is DMAed into memory buffer 328, as illustrated in FIG. 3.

At this point, outbound header 332*a* is re-unioned with payload 334 to form an outbound packet via operations performed by Packet Assembling block 326. Recall from above that payload 334 is tagged with a flow ID and sequence number. In one embodiment handling TCP/IP packets, the sequence number comprises the TCP sequence number in the packet header 332. This is a 16-bit field in the TCP header portion of packet headers 332 and 332*a*, and may generally be unique enough by itself. However, the flow ID is also used to match-up outbound header 332*a* and payload 334. Accordingly, the flow ID for outbound header 332*a* is determined in a manner similar to determining the flow ID for packet header 332. Once the outbound header 332*a* is re-unioned with payload 334, the combined data are copied to outbound buffer 314 to be sent out of output port 310 as an outbound packet 330*a*.

In one embodiment, a NIC may be configured to forward selected packets independent from an operating system. For example, for packets that are destined for a forwarded address that are received and sent out via the same NIC, there may be no changes to the packet payload and only a change of the TTL count in the packet header. Accordingly, a NIC may be configured to perform corresponding packet processing operations for forwarding such packets similar to that performed by a kernel routing module.

Figure 3A:
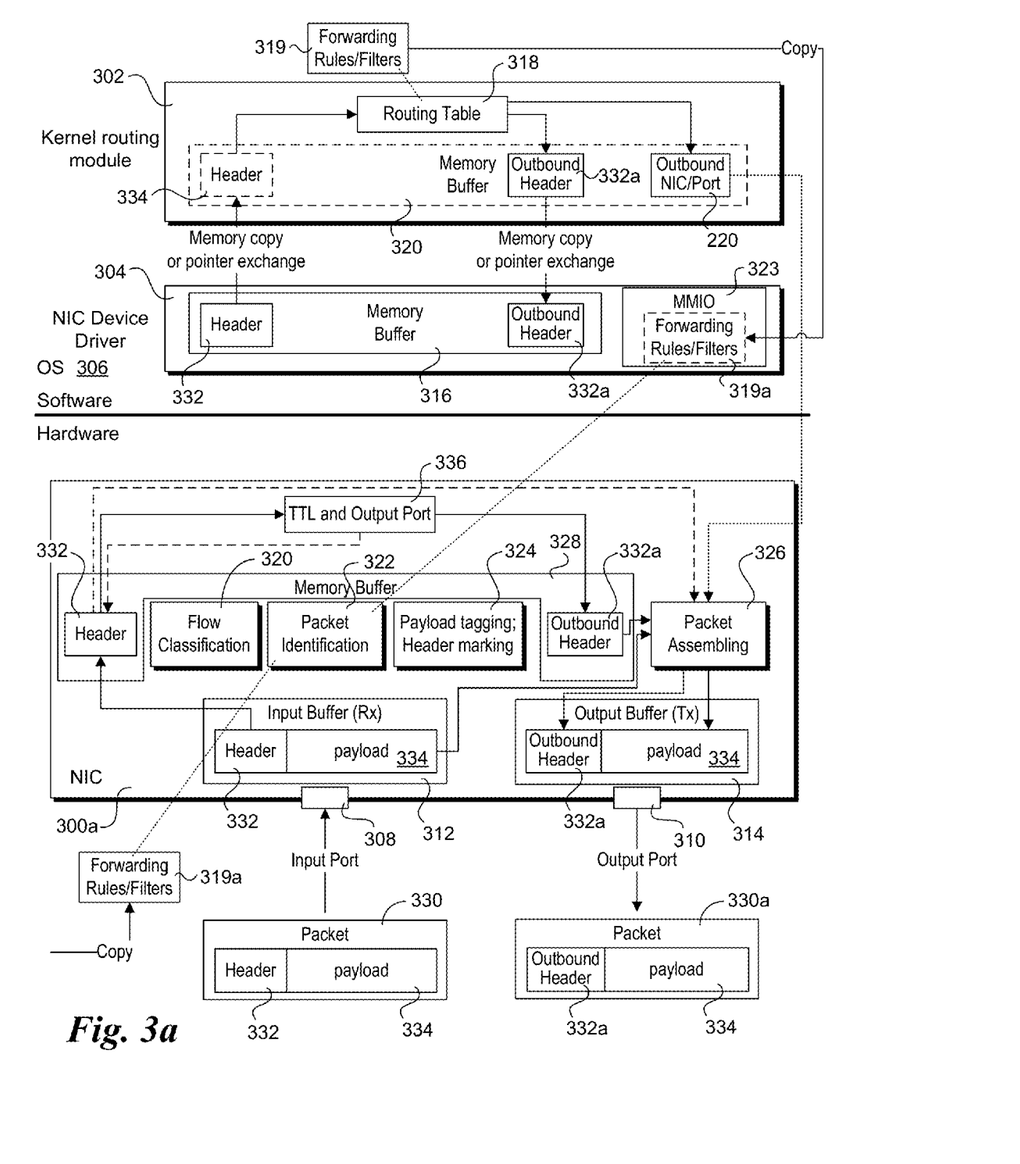
FIG. 3a is a combined architecture and flow diagram illustrating processing of packets a software-based router under which the packets that are received at and are to be forwarded from the same NIC are forwarded via the NIC without being copied into memory for a software-based router host, according to a first embodiment.

FIG. 3*a* shows a NIC 300*a* configured to perform forwarding of MF packets independent of operating system 306. Generally, NIC 300*a* is configured similar to NIC 300 of FIG. 3, where components with the same reference number perform similar operations. Accordingly, NIC 300*a* handles UF packets and unclassified packets in the same manner as NIC 300. However, forwarding of MF packets are handled entirely by NIC 300*a*, as follows.

When a packet 330 is received at input port 308, packet header 332 is copied into memory buffer 328 and the header fields are inspected to detect whether the packet corresponds to an MF, UF, or unclassified flow in the manner described above for NIC 300. If the packet corresponds to an MF, its TTL value is decremented and output port is determined via a block 336. Alternatively, the output port may be determined by Packet Assembling block 326 when assembling outbound packet 330*a*. The TTL value for header 332 may either be outbound in place (i.e., the TTL field value in the header instance copied into memory buffer 320 is changed), or the update of the TTL field value may be applied to a second copy of the header, as depicted by outbound header 332*a*. As before, outbound header 332*a* is re-unioned with packet payload 334 to create an outbound packet 330*a*, which is copied to output buffer 314 and transmitted to the next hop via output port 310.

Figure 3B:
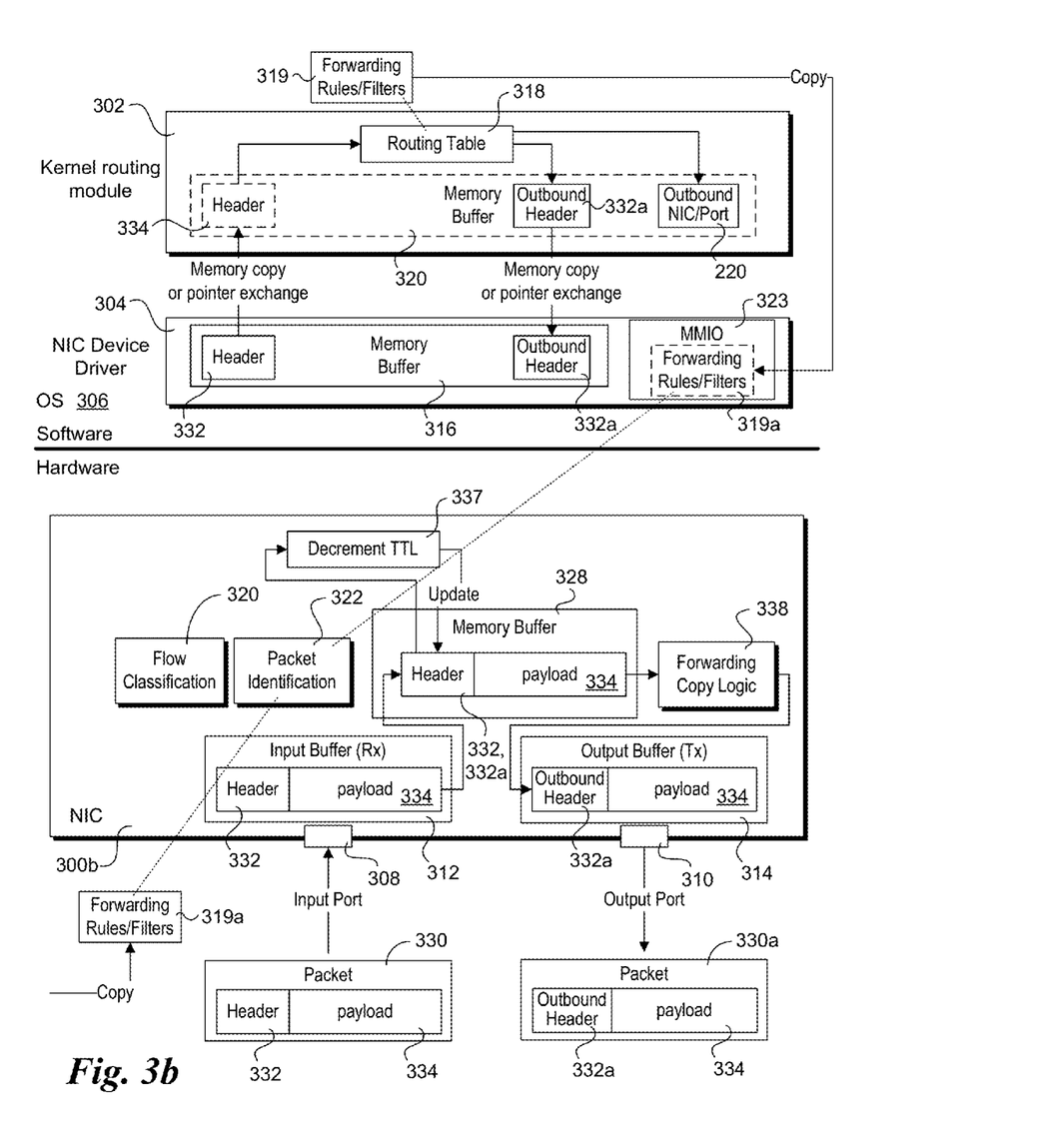
FIG. 3b is a combined architecture and flow diagram illustrating processing of packets a software-based router under which the packets that are received at and are to be forwarded from the same NIC are forwarded via the NIC without being copied into memory for a software-based router host, according to a second embodiment.

FIG. 3*b* shows a second embodiment for forwarding MF packets via a NIC 300*b*. Under this scheme, packet header 332 may be inspected in place or packet header 332 and payload 334 may be copied from input buffer 312 to memory buffer 328. If, during packet inspection it is determined that the packet belongs to a managed flow, a block 337 is employed to decrement the TTL count in packet header 332 in memory buffer 328 (or alternatively, the packet header is updated in place in input buffer 312) to create an outbound packet header 332, and the outbound packet header and packet payload 334 are copied to an applicable output buffer as determined by a forwarding copy logic block 338. Alternatively, the applicable output buffer may be determined by either of Packet Identification block 322 or Flow Classification block 320.

For smaller networks, forwarding rules and filters 319 and 319*a* may be fairly simple. Generally the rules may be based on routing data that is used to determine routes to destination addresses. In many small network environments, each subnet is allocated a range of addresses in accordance with the IPv4 protocol's four-octet addressing scheme. Generally, for a given subnet, the first two octet values (and sometimes the first three octet values) will be the same for all end point destinations within the subnet. Accordingly, a filter rule might assign a flow ID for all packets having first two octet values of nnn.mmm, where each of nnn and mmm represent an octet having a legal value between 0-255. Moreover, for packets that are to be forwarded out of the same NIC that receives the packets, the packet forwarding scheme of NIC 300*b* could be implemented without use of flow IDs, since there is no re-unioning of an outbound packet header and packet payload. Thus, a simple forwarding table including a set of destination address filters could be employed for use with NIC 300*b* for forwarding such packets. In addition, since there is an extremely low likelihood that a packet in a smaller network will be routed in a manner under which it is never dropped and never reaches its destination end-point (which is the purpose of using a TTL countdown value), in one embodiment the TTL field value is not considered by the packet processing and forwarding logic in NIC 300*b*, and thus the packet header is not changed during a packet forwarding operation.

It is noted that the configuration shown for NIC 300*b* also employs components shown in the NIC 300*a* and NIC 300 embodiments for handling UF packets and packets belong to unclassified flows. For clarity and lack of drawing space, such components are not shown in FIG. 3b so as to not obscure the forwarding technique implemented by NIC 300b.

Figure 5:
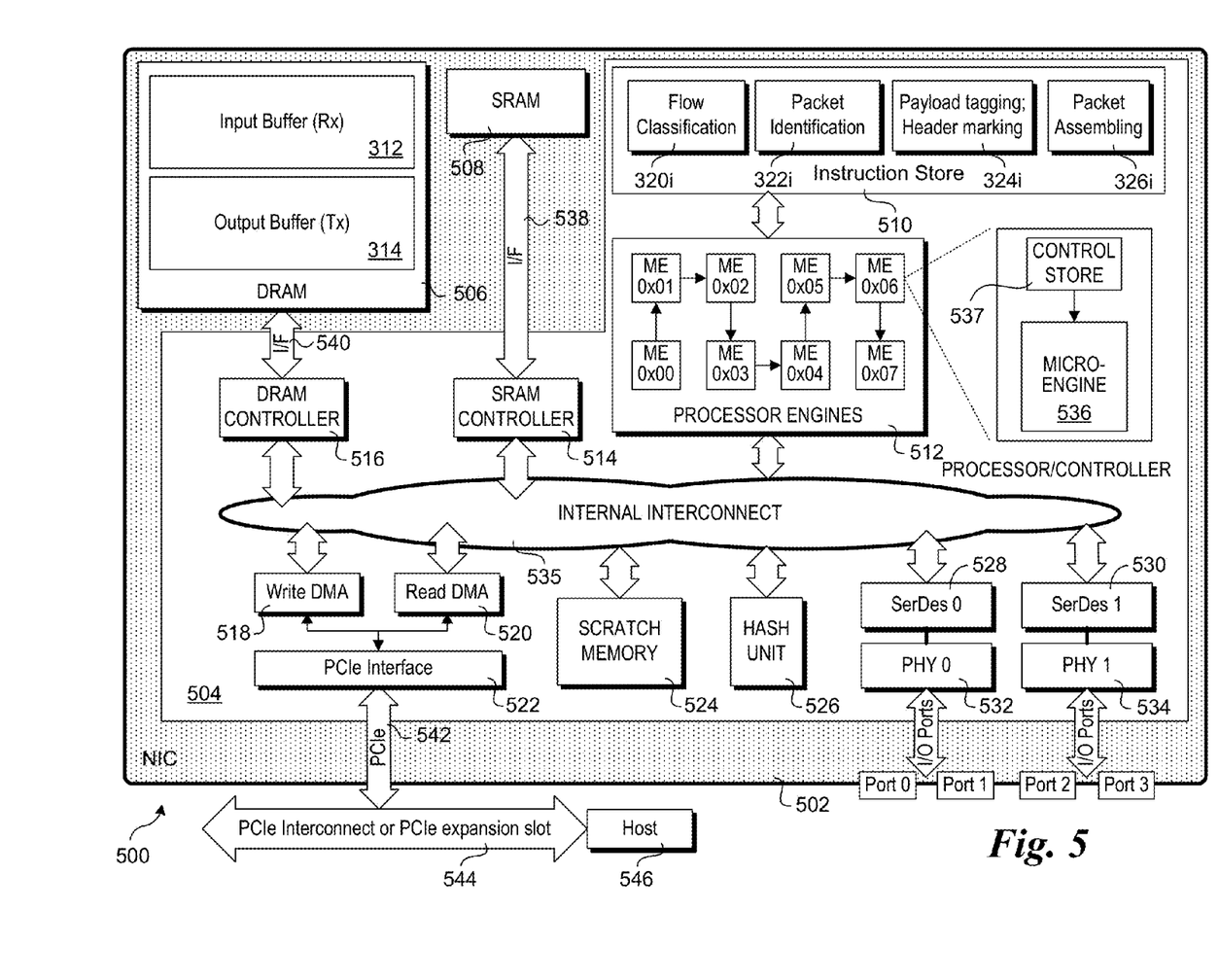
FIG. 5 is a schematic diagram illustrating an architecture for a NIC that may be used for implementing aspects of the embodiments disclosed herein, according to one embodiment.

An exemplary system architecture for a NIC 500 is shown in FIG. 5. NIC 500 includes a NIC system board 502 on which a network processor/controller 504, Dynamic Random Access Memory (DRAM) 506 and Static Random Access Memory (SRAM) 508 are mounted. Under various embodiments. NIC system board 502 is representative of an Ethernet controller card, a daughter board, a multi-chip module board or substrate, or it may be part of a computer system board, such as a main board or motherboard for a computer server. Processor/controller 504 is representative of Ethernet processing and/or control unit, and may be embodied in various forms, including as an Ethernet controller chip or a network processor unit (NPU).

In the illustrated embodiment, processor/controller 504 includes an instruction store 510, a cluster of processor engines 512, an SRAM controller 514, a DRAM controller 516, a Write DMA block 518, a Read DMA block 520, a PCIe interface 522, a scratch memory 524, a hash unit 526, Serializer/Deserializers (SerDes) 528 and 530, and PHY interfaces 532 and 534. Each of the components is interconnected to one or more other components via applicable interconnect structure and logic that is collectively depicted as an internal interconnect cloud 535.

Instruction store 510 includes various instructions that are executed by processor engines cluster 512, including Flow Classification instructions 320i, Packet Identification instructions 322i, Payload tagging and Header marking instructions 324i, and Packet Assembling instructions 326i. Processor engines cluster 512 includes a plurality of microengines 536, each coupled to a local control store 537. Under one embodiment, various operations such as packet identification and flow classification are performed using a pipelined architecture, such as illustrated in FIG. 5, with each microengine performing an associated operation in the pipeline. As an alternative, processor engines cluster 536 is representative of one or more processor cores in a central processing unit or controller. As yet another option, the combination of processor engines 512 and instruction store 510 may be implemented as embedded logic, such as via a Field Programmable Gate Array (FPGA) or the like.

In one embodiment, instruction store 510 is implemented as an on-chip store, such as depicted in FIG. 5. Optionally, a portion or all of the instructions depicted in instruction store 510 may stored in SRAM 508 and accessed using SRAM controller 514 via an interface 538. SRAM 508 may also be used for storing selected data and/or instructions relating to packet processing operations.

DRAM 506 is used to store one or more Input Buffers 312 and one or more Output Buffers 314, and is accessed using DRAM controller 516 via an interface 540. Write DMA block 518 and Read DMA block 520 are respectively configured to support DMA Write and Read operations in accordance with the embodiments described herein. In the illustrated embodiment, DMA communication between DRAM 506 and a platform host circuitry is facilitated over PCIe interface 522 via a PCIe link 542 coupled to a PCIe interconnect or PCIe expansion slot 544, enabling DMA Write and Read transfers between DRAM 506 and system memory for a host 546 using the PCIe protocol.

Scratch memory 524 and hash unit 526 are illustrative of components employed by NICs for facilitating scratch memory and hashing operations relating to packet processing. For example, as described above a hash operation may be implemented for deriving flow IDs and for packet identification.

PHYs 532 and 534 facilitate Physical layer operations for the NIC, and operate as a bridge between the digital domain employed by the NIC logic and components and the analog domain employed for transmitting data via electrical, optical or wired signals. For example, in the illustrated embodiment of FIG. 5, each of PHYs 532 and 534 is coupled to a pair of I/O ports configured to send electrical signals over a wire cable such as a Cat5e or Cat6 cable. Optical and wireless signal embodiments would employ additional circuitry and interfaces for facilitating connection via optical and wireless signals (not shown). In conjunction with PHY operations, SerDes 528 and 530 are used to serialize output packet streams and deserialize inbound packet streams.

In addition to the instructions shown in instruction store 510, other instructions may be implemented via execution of processor engines 512 or other processing means to facilitate additional operations. For example, in one embodiment, NIC 500 is configured to implement a TCP/IP stack on the NIC itself NIC 500 may also be configured to facilitate TCP operations in a manner that is offloaded from the Operating System TCP facilities, whereby once a packet is sent outbound, NIC 500 is responsible for processing an ACK message and resending the packet if an ACK message is not received within an applicable TCP timeout value.

As discussed above, a NIC may be configured to store routing data for facilitating packet identification and flow classification, including forwarding filters and rules either locally or using a MMIO address space in system memory. When stored locally, this routing data may be stored in either DRAM 506 or SRAM 508. Routing data stored in a MMIO address space may be accessed by NIC 500 via Read DMA operations. Generally, setting up MMIO address space mapping may be facilitated by a NIC device driver in coordination with the operating system. The NIC device driver may also be configured to enable instructions in instruction store 510 to be updated via the operating system. Optionally, the instructions in instruction store may comprise firmware instructions that are stored in non-volatile memory, such as Flash memory, which may either be integrated on processor/controller 504 or mounted to NIC system board 502 (not shown).

Figure 6:
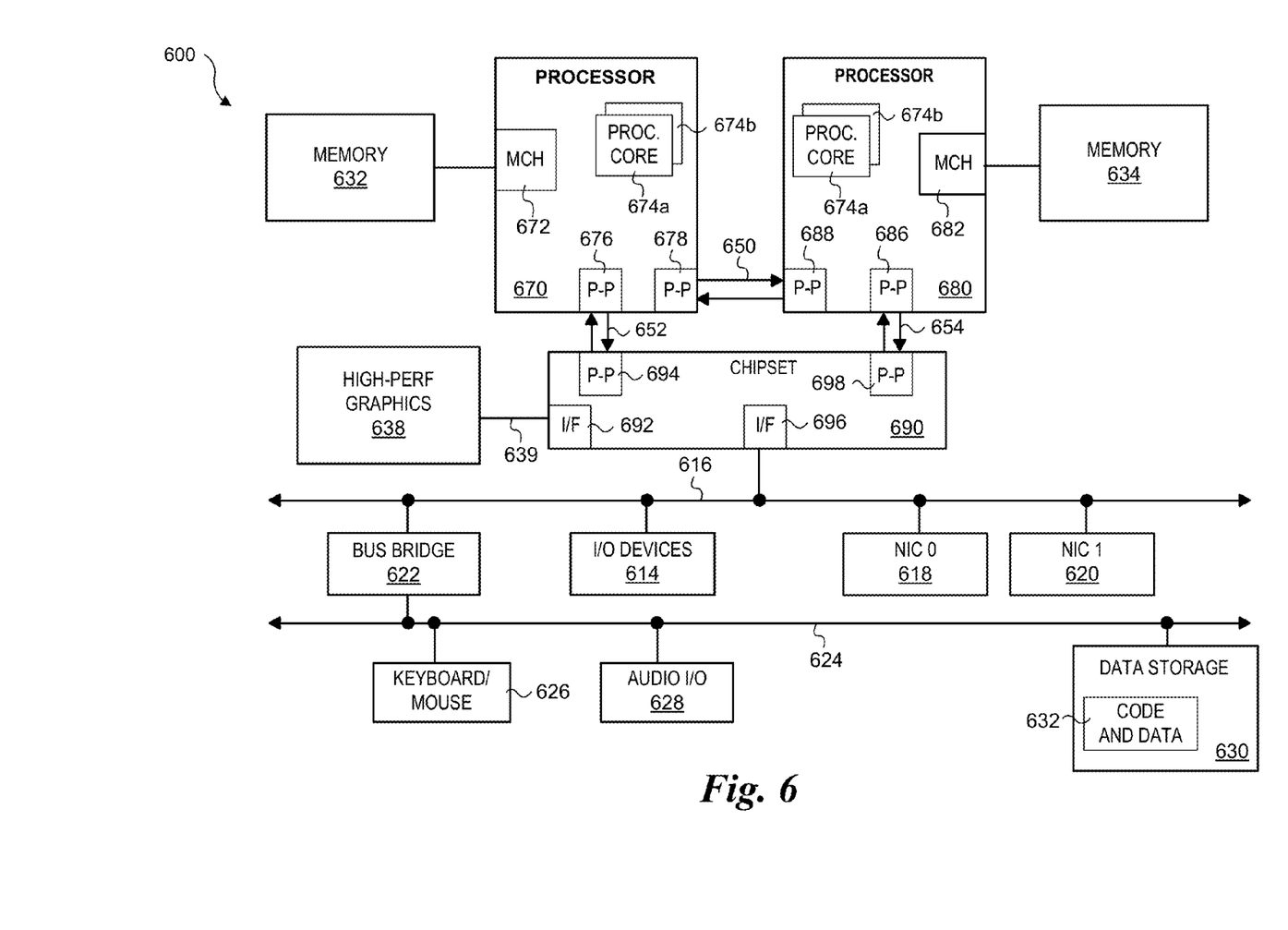
FIG. 6 is a block diagram of an exemplary multi-processor computer architecture, according to one embodiment.

Generally, the embodiments may be implemented in computer systems having various types of architectures. For example, FIG. 6 is a block diagram of a multiprocessor system 600 in which aspects of the embodiments herein may be implemented. As shown in FIG. 6, multiprocessor system 600 employs a point-to-point interconnect architecture, and includes a first processor 670 and a second processor 680 coupled via a point-to-point (P-P) interconnect 650. Each of processors 670 and 680 may comprise multi-core processors, including multiple cores, such as exemplified by the depiction of two processor cores 674a and 674b and 684a and 684b for first and second processors 670 and 680, respectively. Each of the processors can include various hardware and/or logic to enable link operations.

Still referring to FIG. 6, first processor 670 further includes a memory controller hub (MCH) 672 and P-P interfaces 676 and 678. Similarly, second processor 680 includes an MCH 682 and P-P interfaces 686 and 688. As illustrated, MCH's 672 and 682 couple the processors to respective memories, namely a memory 632 and a memory 634, which may be comprise portions of system memory (e.g., DRAM) locally attached to the respective processors. First processor 670 and second processor 680 may be coupled to a chipset 690 via P-P interconnects 652 and 654, respectively. As shown in FIG. 6, chipset 690 includes P-P interfaces 694 and 698.

Additionally, chipset 690 includes an interface (I/F) 692 to couple chipset 690 with a high performance graphics engine 638 via a P-P interconnect 639. In turn, chipset 690 may be coupled to a first bus 616 via an interface 696, such as a PCIe interface. As shown in FIG. 6, various input/output (I/O) devices 614 and NICs 618 and 620 may be coupled to first bus 616, along with a bus bridge 622 that couples first bus 616 to a second bus 624. Various devices may be coupled to second bus 624 including, for example, a keyboard/mouse 626, audio I/O device 628 and a data storage unit 630 such as a disk drive or other mass storage device which may include code and data 632, in one embodiment. In addition to the system configurations such as multiprocessor system 600, aspects of embodiments described herein may be incorporated into other various types of systems, including desktop computers, stand-alone servers, blade servers, and rack servers. Moreover, such systems may employ a single processor, including a System on a Chip (SoC) employing multiple processor cores.

The embodiments herein provide significant benefits over approaches employed by conventional software router architectures. Since packet payload data for managed flows remains on the NIC without being copied into a host's system memory, there is a reduction of DMA and cache memory operations when compared to conventional software router implementations. For embodiments under which a NIC is configured to perform the processing of both the packet header and payload for managed flows, further reduction in memory transfer overhead may be obtained. Moreover, in addition to reducing overhead, energy savings may likewise be obtained under the embodiments disclosed herein.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software running on a server or firmware executed by an embedded processor on a NIC. Thus, embodiments of this invention may be used as or to support a software program, software modules, firmware, and/or distributed software executed upon some form of processing core (such as the CPU of a computer, one or more cores of a multi-core processor or a microengine), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method performed in a in a host computer system including a plurality of Network Interface Controller (NICs), each NIC including at least one input/output (I/O) port comprising an input port and an output port, the host computer system employing an operating system configured to implement a software-based router, the method comprising:

classifying packet flows via operations performed by the software-based router, the classified packet flows including a first flow classification type under which packets are received at and forwarded out of a same NIC and a second flow classification type under which packets are received at and forwarded out of different NICs;

generating, via the software-based router, at least one of packet filtering and rule data, and a flow identifier (ID) for each of a plurality of classified packet flows;

receiving a packet at an input port of a first NIC in the host computer system;

storing a packet header and a packet payload for the packet in an input buffer comprising a first memory buffer on the first NIC;

employing the at least one of packet filtering and rule data and flow IDs at the first NIC to determine whether the packet is classified as a first flow classification type or a second flow classification type;

if the packet is classified as a first flow classification type,
copying the packet header into a second memory buffer accessible to a software component on the host computer system associated with the software-based router;
modifying the packet header via the software component to create an outbound packet header;
re-unioning the outbound packet header with the packet payload on the first NIC to create an outbound packet; and
transmitting the outbound packet via the output port on the first NIC.

2. The method of claim 1, further comprising:
copying the packet header from a memory buffer on the first NIC to the second memory buffer using a direct memory access (DMA) operation, the memory buffer being either the first memory buffer or a separate memory buffer on the NIC.

3. The method of claim 1, further comprising:
copying the outbound packet header from a memory buffer in system memory of the host computer system to a memory buffer on the first NIC using a direct memory access (DMA) operation, the memory buffer being a separate memory buffer from the first memory buffer.

4. The method of claim 1, further comprising:
marking the packet header to identify it corresponds to a classified packet flow under which packets belonging to the classified packet flow are to be forwarded out of the output port on the first NIC.

5. The method of claim 1, further comprising:
tagging the packet payload with unique indicia derivable from data in the packet header; and p1 employing the unique indicia to re-union the outbound packet header with the packet payload.

6. The method of claim 1, further comprising:
inspecting at least one field in the packet header and employing data corresponding to the at least one field as an input to a routing table to determine whether the packet is to be forwarded via an output port on the first NIC, and if so,
copying an instance of the packet header and packet payload to an output buffer associated with the output port, the copy of the packet header and packet payload comprising an outbound packet; and
transmitting the outbound packet out of an output port of the first NIC.

7. The method of claim 6, further comprising decrementing a Time to Live (TTL) value in a TTL field of the packet header at the first NIC.

8. The method of claim 1, further comprising:
storing at least one of packet filtering and rule data in a forwarding table assessable to the software-based router;

copying at least a portion of the at least one of packet filtering and rule data in the forwarding table to a forwarding table in memory on the first NIC; and
employing the at least one of packet filtering and rule data in the forwarding table in memory on the first NIC to determine whether a received packet belongs to a classified packet flow.

9. The method of claim 8, further comprising:
in response to determining the received packet does not belong to a classified packet flow,
copying packet data corresponding to the packet from a memory buffer on the first NIC to a memory buffer accessible to a software component associated with the software-based router; and
generating a new classified packet flow for the packet.

10. The method of claim 1, further comprising:
storing at least one of packet filtering and rule data in a forwarding table assessable to the software-based router;
copying at least a portion of the at least one of packet filtering and rule data in the forwarding table to a forwarding table in a memory-mapped input/output (MMIO) address space in system memory for the host computer system; and
assessing, via the first NIC, at least one of packet filtering and rule data in the forwarding table in the MMIO address space to determine whether a received packet belongs to a classified packet flow.

11. A Network Interface Controller (NIC), configured to be installed in a host computer system in which a software-based router is implemented, comprising:
at least one processing element;
memory, operatively coupled to the at least one processing element when the NIC is operating;
at least one input port;
at least one output port; and
an instruction store having instructions stored therein configured to be executed by the at least one processing element to enable the NIC to perform operations when operating, the operations including;
in response to receiving a packet at an input port,
buffering a packet header and a packet payload for the packet in an input buffer on the NIC;
inspecting the packet header for the packet to determine if the packet corresponds to a first type of classified flow under which packets received at an input port on the NIC are to be forwarded out of an output port on the NIC or if the packet corresponds to a second type of classified flow under which packets received at an input port on the NIC are to be forwarded out of an output port of another NIC installed in the host computer system, wherein the determination of whether the packet belongs to the first or second type of classified flow employs packet filtering data generated by the software-based router;
and in response to determining the packet corresponds to the first type of classified flow,
performing a direct memory access (DMA) copy of the packet header for the packet from the input buffer to a memory buffer in the host computer system;
receiving an outbound packet header via a DMA copy of the outbound packet header from a memory buffer in the host computer system to a memory buffer in the NIC memory, the outbound packet header comprising a modified version of the packet header copied to the memory buffer in the host computer system;

re-unioning the outbound packet header with the packet payload for the packet to create an outbound packet on the NIC; and transmitting the outbound packet out of an output port of the NIC.

12. The NIC of claim 11, wherein execution of the instructions, when the NIC is operating, performs further operations comprising:

marking the packet header to identify it corresponds to the first type of classified flow.

13. The NIC of claim 11, wherein execution of the instructions, when the NIC is operating, performs further operations comprising:

tagging the packet payload with unique indicia; and employing the unique indicia to re-union the outbound packet header with the packet payload.

14. The NIC of claim 13, wherein the packet comprises a Transmission Control Protocol (TCP) packet, and the unique indicia includes a TCP packet sequence number.

15. The NIC of claim 11, wherein the filtering data comprises a plurality of flow identifiers (IDs) that are derived as a function of a data from one or more fields in a packet header, and wherein the instructions in the instruction store including instructions for deriving a flow ID based on data in the packet header when the instructions are executed by the at least one processing element.

16. The NIC of claim 15, wherein the function comprises a hash function.

17. The NIC of claim 11, wherein execution of the instructions, when the NIC is operating, performs further operations comprising:

in response to determining the packet does not correspond to a first type or second type of classified flow, performing a DMA copy of the packet header from the NIC to a memory buffer in the host computer system.

18. The NIC of claim 11, wherein the packet filtering data is accessed from a memory-mapped input/output (MMIO) address space in system memory for the host computer system.

19. A computer system comprising:

a main board including interconnect circuitry;

a processor, coupled to the interconnect circuitry;

system memory, coupled to the interconnect circuitry;

a plurality of Network Interface Controllers (NICs), each either comprising a card installed in a respective expansion slot on the main board or comprising a set of components coupled to the main board including at least one component coupled to the interconnect circuitry; and storage, in which instructions comprising an operating system including a software router module are stored, wherein, upon operation, the computer system is configured to perform operations via execution of the operating system and software router module instructions via the processor and via operations performed by a first NIC among the plurality of NICs including, classifying packet flows into multiple flow classification types including a first flow classification type under which packets are received under which packets received at an input port on the first NIC are to be forwarded out of an output port on the first NIC and a second flow classification type under which packets are received at and forwarded out of different NICs;

generating at least one of packet filtering and rule data, and a flow identifier (ID) for each of a plurality of classified packet flows;

receiving a packet at an input port of the first NIC;

buffering a packet header and a packet payload for the packet in an input buffer on the first NIC;

inspecting the packet header for the packet to determine if the packet corresponds to the first type of classified flow by employing the at least one of packet filtering and rule data, and the flow IDs;

and in response to determining the packet corresponds to the first type of classified flow, copying the packet header into a memory buffer in system memory using a first direct memory access (DMA) operation;

modifying the packet header to create an outbound packet header;

copying the outbound packet header to a buffer on the first NIC using a second DMA operation;

re-unioning the outbound packet header with the packet payload on the first NIC to create an outbound packet; and transmitting the outbound packet out of an output port of the first NIC.

20. The computer system of claim 19, wherein the first NIC is further configured to mark the packet header to identify it corresponds to the first type of classified flow.

21. The computer system of claim 19, wherein the first NIC is further configured to:

tag the packet payload with unique indicia derived from data in the packet header; and employ the unique indicia to re-union the outbound packet header with the packet payload.

22. The computer system of claim 19, wherein execution of the software router module instructions performs operations comprising:

storing at least one of packet filtering and rule data in a forwarding table in the system memory;

copying at least a portion of the at least one of packet filtering and rule data in the forwarding table to a forwarding table in memory on the first NIC, and wherein the first NIC is configured to employ the at least one of packet filtering and rule data in the forwarding table to determine whether a received packet belongs to a classified packet flow.

23. The computer system of claim 19, wherein the first NIC is further configured to:

in response to determining the received packet does not below to a classified packet flow, copy packet data corresponding to the packet from a memory buffer on the first NIC to a memory buffer in system memory, and wherein execution of the software router module instructions performs operations comprising, inspecting the packet header data for the packet;

generating a new classified packet flow for the packet; and updating a forwarding table with forwarding data related to the new classified packet flow.

* * * * *